(12) United States Patent
Zheng et al.

(10) Patent No.: US 11,146,988 B2
(45) Date of Patent: Oct. 12, 2021

(54) VOICE OVER LONG-TERM EVOLUTION (VOLTE) DATA GUARANTEE METHOD AND DEVICE

(71) Applicant: Comba Telecom Systems (China) Limited, Guangdong (CN)

(72) Inventors: Ziyong Zheng, Guangdong (CN); Bo Yang, Guangdong (CN); Wenxiang Guan, Guangdong (CN)

(73) Assignee: Comba Network Systems Company Limited, Guangdong (CN)

( * ) Notice: Subject to any disclaimer, the term of this patent is extended or adjusted under 35 U.S.C. 154(b) by 49 days.

(21) Appl. No.: 16/621,967

(22) PCT Filed: Dec. 12, 2017

(86) PCT No.: PCT/CN2017/115716
§ 371 (c)(1),
(2) Date: Dec. 12, 2019

(87) PCT Pub. No.: WO2018/227906
PCT Pub. Date: Dec. 20, 2018

(65) Prior Publication Data
US 2020/0178117 A1 Jun. 4, 2020

(30) Foreign Application Priority Data
Jun. 12, 2017 (CN) .......................... 201710440046.9

(51) Int. Cl.
*H04W 28/04* (2009.01)
*H04L 1/00* (2006.01)
(Continued)

(52) U.S. Cl.
CPC ........... *H04W 28/04* (2013.01); *H04L 1/0042* (2013.01); *H04L 1/0047* (2013.01); *H04L 12/4633* (2013.01); *H04L 43/0835* (2013.01)

(58) Field of Classification Search
None
See application file for complete search history.

(56) References Cited

U.S. PATENT DOCUMENTS 9,179,364 B2 * 11/2015 Ramkumar ........... H04W 28/10
10,826,539 B2 * 11/2020 Xi ..................... H03M 13/2942
(Continued)

FOREIGN PATENT DOCUMENTS

CN 1482779 A 3/2004
CN 101114987 A 1/2008
(Continued)

OTHER PUBLICATIONS

International Search Report and Written Opinion issued by the International Searching Authority (ISA/CN) in PCT Application No. PCT/CN2017/115716 dated Feb. 24, 2018. 8 pages including the English translation of the International Search Report.

*Primary Examiner* — Ayaz R Sheikh
*Assistant Examiner* — Faiyazkhan Ghafoerkhan
(74) *Attorney, Agent, or Firm* — Meunier Carlin & Curfman LLC (57) ABSTRACT

The embodiments of the present application relate to the technical field of communications, and particularly relate to a Voice over Long-Term Evolution (VoLTE) data guarantee method and device, this being used for ameliorating the problem of poor VoLTE call quality caused by poor access network quality. The method involves: a first device receiving at least one group of first data packets sent by a second device; with regard to each group of first data packets in the at least one group of first data packets, executing the operation of the first device carrying out FEC coding on M VoLTE data packets comprised in the group of first data packets to obtain N FEC redundant data packets; adding FEC group information, corresponding to each data packet, to each data packet among the M VoLTE data packets and N
(Continued)

FEC redundant data packets; and sending, to a third device, the M VoLTE data packets and N FEC redundant data packets with the FEC group information added thereto. Thus, the VoLTE data packet loss rate of an access network is lowered, and the problem of poor VoLTE call quality, caused by poor access network transmission quality, is ameliorated.

14 Claims, 6 Drawing Sheets

(51) Int. Cl.
*H04L 12/46* (2006.01)
*H04L 12/26* (2006.01)

(56) References Cited

U.S. PATENT DOCUMENTS

| | | | |
|---|---|---|---|
| 2005/0160346 A1* | 7/2005 | Yamane | H04L 1/0009 714/776 |
| 2009/0135774 A1* | 5/2009 | Kang | H04L 1/0067 370/329 |
| 2010/0050058 A1* | 2/2010 | Long | H04L 1/0045 714/776 |
| 2013/0322331 A1* | 12/2013 | Ramkumar | H04W 28/10 370/328 |
| 2014/0355590 A1* | 12/2014 | Cho | H04W 76/15 370/338 |
| 2015/0063261 A1* | 3/2015 | Kim | H04L 65/1016 370/329 |
| 2015/0124671 A1* | 5/2015 | Tabet | H04L 1/1887 370/311 |
| 2016/0007284 A1* | 1/2016 | Futaki | H04W 52/0229 370/311 |
| 2016/0021698 A1* | 1/2016 | Zhao | H04W 52/028 370/329 |
| 2016/0036560 A1* | 2/2016 | Krishnan | H04L 1/1835 714/748 |
| 2016/0036564 A1* | 2/2016 | Krishnan | H04L 1/0045 714/748 |
| 2016/0142936 A1* | 5/2016 | Bressanelli | H04W 28/06 370/242 |
| 2017/0005989 A1* | 1/2017 | Jia | H04L 63/101 |
| 2017/0054622 A1* | 2/2017 | Mishra | H04L 1/22 |
| 2017/0125028 A1* | 5/2017 | Sinder | H04L 1/0076 |
| 2017/0125029 A1* | 5/2017 | Atti | H04L 1/007 |
| 2017/0135009 A1* | 5/2017 | Ling | H04L 1/0023 |
| 2017/0187774 A1* | 6/2017 | Qiu | H04L 43/0894 |
| 2017/0201443 A1* | 7/2017 | Sung | H04L 65/1059 |
| 2017/0250782 A1* | 8/2017 | Zahemszky | H04L 1/0061 |
| 2017/0359150 A1* | 12/2017 | Xu | H04L 1/0054 |
| 2019/0140784 A1* | 5/2019 | Xi | H04L 1/1845 |

FOREIGN PATENT DOCUMENTS

| | | |
|---|---|---|
| CN | 101296055 A | 10/2008 |
| CN | 101557277 A | 10/2009 |
| CN | 104424949 A | 3/2015 |
| CN | 105634504 A | 6/2016 |
| CN | 107241166 A | 10/2017 |
| GN | 1638321 A | 7/2005 |
| GN | 101459654 A | 6/2009 |
| WO | 2010141762 A1 | 12/2010 |
| WO | 2016179382 A1 | 11/2016 |

* cited by examiner

VOICE OVER LONG-TERM EVOLUTION (VOLTE) DATA GUARANTEE METHOD AND DEVICE

The present application is a US National Stage of International Application No. PCT/CN2017/115716, filed on Dec. 12, 2017, which claims the priority from Chinese Patent Application No. 201710440046.9, filed with the Chinese Patent Office on Jun. 12, 2017 and entitled "Voice over Long-Term Evolution (VoLTE) Data Guarantee Method and Device", which is hereby incorporated by reference in its entirety.

FIELD

The embodiments of the present application relate to the field of communication technologies, and particularly to a Voice over Long-Term Evolution (VoLTE) data guarantee method and device.

BACKGROUND

In the Long Term Evolution (LTE) system, in order to save the transmission cost, the operators integrate the LIE base station access network with the traditional fixed-line broadband network. Especially for the LTE integrated micro base station, the access network has uneven transmission quality. In the case when the transmission load pressure of the access network is large, the service quality of the base station has also deteriorated sharply, causing the problems such as rate not up to standard, poor call quality and others. Especially when the Voice over Long Term Evolution (VoLTE) has the poor call quality, it often suffers from the customer complaints, leading to the poor operation and maintenance indicators of the base station and thus bringing the large loss to the operators.

In the prior art, only the error correction mechanism of the user terminal can be relied on. However, most of the VoLTE user terminals have no Forward Error Correction (FEC) ability, but the transmission quality in turn depends on the LTE transmission system, so the VoLTE data packet loss of the access network leads to the problem of poor voice quality. At present there are few other solutions, except for artificially increasing the transmission bandwidth to improve the transmission quality, which, however, raises the cost and is difficult to implement.

Therefore, a VoLTE data guarantee method and device is urgently needed to solve the problem of poor VoLTE call quality due to the poor transmission quality of the access network.

SUMMARY

The embodiments of the present application provide a VoLTE data guarantee method and device, so as to lower the loss rate of the MATE data packets of the access network and improve the poor VoLTE call quality due to the poor transmission quality of the access network.

In a first aspect, an embodiment of the present application provides a VoLTE data guarantee method including: receiving, by a first device, at least one group of first data packets sent by a second device, where each of the at least one group of first data packets includes at least one first data packet, and one group of first data packets corresponds to one service; for each of the at least one group of first data packets: performing, by the first device, FEC encoding on M VoLTE data packets included in the group of first data packets to obtain N FEC redundant data packets, where M is a positive integer and N is a positive integer less than M; adding, by the first device, FEC group information corresponding to each of the M VoLTE data packets and the N FEC redundant data packets to the data packet; and sending, by the first device, the M VoLTE data packets and the N FEC redundant data packets with the FEC group information added to a third device.

In a second aspect, an embodiment of the present application provides a first device for guaranteeing VoLTE data, which includes:

a receiving unit configured to receive at least one group of first data packets sent by a second device, where each of the at least one group of first data packets includes at least one first data packet, and one group of first data packets corresponds to one service;

a processing unit configured, for each of the at least one group of first data packets, to perform FEC encoding on M VoLTE data packets included in the group of first data packets to obtain N FEC redundant data packets, where M is a positive integer and N is a positive integer less than M; and to add FEC group information corresponding to each of the M VoLTE data packets and the N FEC redundant data packets to the data packet;

a sending unit configured to send the M VoLTE data packets and the N FEC redundant data packets with the FEC group information added to a third device.

In a third aspect, an embodiment of the present application provides a first device, which includes: a transceiver, a processor, a memory and a communication interface, where the transceiver, the processor, the memory and the communication interface are connected via a bus;

the transceiver is configured to receive at least one group of first data packets sent by a second device and send M VoLTE data packets and N FEC redundant data packets with FEC group information added to a third device, where each of the at least one group of first data packets includes at least one first data packet, and one group of first data packets corresponds to one service;

the processor is configured to read programs in the memory to perform the method of:
  for each of the at least one group of first data packets, performing FEC encoding on M VoLTE data packets included in the group of first data packets to obtain N FEC redundant data packets, where M is a positive integer and N is a positive integer less than M;
  adding FEC group information corresponding to each of the M VoLTE data packets and the N FEC redundant data packets to the data packet;

the memory is configured to store one or more executable programs and store data used by the processor when performing operations.

In a fourth aspect, an embodiment of the present application provides a non-transitory computer readable storage medium, where the non-transitory computer readable storage medium stores computer instructions which cause the computer to perform the method in the first aspect or any possible embodiment of the first aspect.

In a fifth aspect, an embodiment of the present application provides a computer program product including computer programs stored on a non-transitory computer readable storage medium, where the computer programs include computer instructions which, when executed by a computer, cause the computer to perform the method in the first aspect or any possible embodiment of the first aspect.

In the embodiments of the present application, the first device receives at least one group of first data packets sent by the second device, where each of the at least one group of first data packets includes at least one first data packet, and one group of first data packets corresponds to one service. For each of the at least one group of first data packets: the first device performs the FEC encoding on M VoLTE data packets included in the group of first data packets to obtain N FEC redundant data packets. The first device adds the FEC group information corresponding to each of the M VoLTE data packets and the N FEC redundant data packets to the data packet, and sends the M VoLTE data packets and the N FEC redundant data packets with the FEC group information added to the third device. That is, the FEC group information is added to the data packets sent by the first device to the third device. Thus the integrity of the data packets sent by the first device to the third device is ensured, and the loss rate of the VoLTE data packets of the access network is lowered and the poor VoLTE stall quality due to the poor transmission quality of the access network is improved.

BRIEF DESCRIPTION OF THE DRAWINGS

In order to illustrate the technical solutions in the embodiments of the present application more clearly, the accompanying figures which need to be used in describing the embodiments will be introduced below briefly.

DETAILED DESCRIPTION OF EMBODIMENTS

In order to make the objects, technical solutions and beneficial effects of the present application clearer, the present application will further be illustrated below in details in combination with the drawings and the embodiments. It should be understood that the specific embodiments described herein are only used to explain but not limit the present application.

Figure 1:
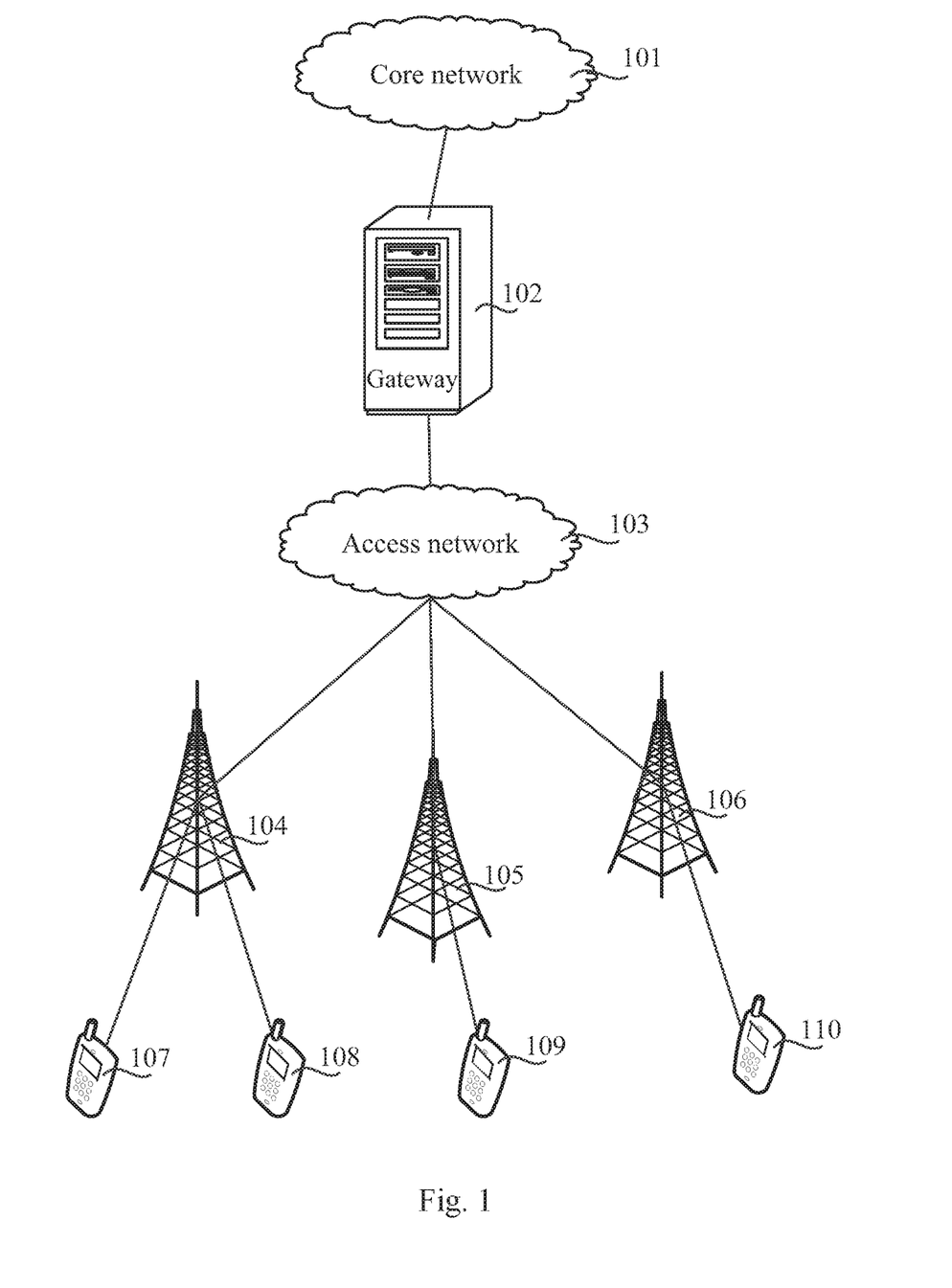
FIG. 1 is an architectural schematic diagram of a VoLTE data guarantee system provided by embodiments of the present application.

FIG. 1 exemplarily shows the architectural schematic diagram of a VoLTE data guarantee system applicable to the embodiments of the present application. The system includes a core network, a gateway and base stations, where the core network manages a plurality of base stations through the gateway. The data transmission may be performed between the core network and a plurality of base stations, each base station manages a plurality of terminals, and the base stations and the gateway are connected via the access network.

As shown in FIG. 1, the system architecture includes the core network 101, gateway 102, access network 103, base station 104, base station 105 and base station 106. Where the base station 104 is connected to the terminals 107 and 108, the base station 105 is connected to the terminal 109, and the base station 106 is connected to the terminal 110.

The core network 101 is linked to the base stations 104, 105, 106 via the gateway 102, the gateway is connected to the core network via the access network 103; optionally, the gateway 102 is connected to the core network 101 and the access network 103 via the S1 interface function. Optionally, the GTP or S1u tunnel is established among the core network 101, gateway 102, and access network 103 for transmitting the data packets.

In the embodiments of the present application, the complete transmission of the VoLTE data can also be guaranteed when the access network between the base station and the gateway has the poor quality. And in the embodiments of the present application, the uplink transmission link of the VoLTE data is: terminal, base station, access network, gateway and core network, and the downlink transmission link of the VoLTE data is: core network, gateway, access network, base station and terminal.

Figure 2:
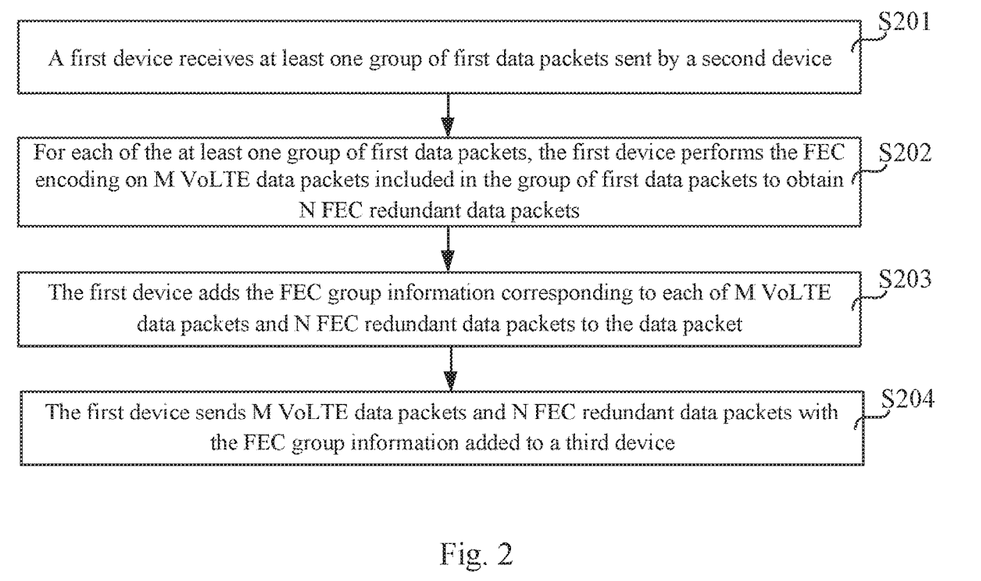
FIG. 2 is a flow schematic diagram of a VoLTE data guarantee method provided by embodiments of the present application.

FIG. 2 exemplarily shows the flow schematic diagram of a VoLTE data guarantee method provided by embodiments of the present application.

Based on the system architecture shown in FIG. 1, as shown in FIG. 2, the VoLTE data guarantee method provided by the embodiments of the present application includes the steps as follows.

Step S201: a first device receives at least one group of first data packets sent by a second device, where each of the at least one group of first data packets includes at least one first data packet, and one group of first data packets corresponds to one service;

Step S202: for each of the at least one group of first data packets, the first device performs the encoding on M VoLTE data packets included in the group of first data packets to obtain N FEC redundant data packets, where M is a positive integer and N is a positive integer less than M;

Step S203: for each of M VoLTE data packets and N FEC redundant data packets, the first device adds, to the data packet, the FEC group information corresponding to the data packet;

Step S204: the first device sends M VoLTE data packets and N FEC redundant data packets with the FEC group information added to a third device.

In the step 201 of the above embodiments, the first device may be a base station or a gateway; the first data packet is the VoLTE data packet, that is to say, the QoS Class Identifier (QCI) of the bearer channel of the first data packet is any of 1, 2 and 5. For the case when one group of first data packets corresponds to one service, for example, a piece of VoLTE voice data is sent through three data packets, where the piece of VoLTE voice data is a service, and these three data packets are a group of first data packets.

In the step S202 of the above-mentioned embodiments, following the above example, a piece of VoLTE voice data is sent through three data packets which are three VoLTE data packets. The encoding is performed on the three VoLTE data packets to obtain N FEC redundant data packets, where N may be 1 or 2.

In the step S203 of the above-mentioned embodiments, the FEC group information includes: the group number, the group size, the position of the current data packet within the group, the data packet identity, the length of the current data packet. The group number is the order number of the group where the current data packet is located. The group size is the total number of the data packets included in the group where the current data packet is located, for example, the group size of the group where the current data packet is located is 11, i.e., this group includes 11 data packets. The data packet identity may be represented in many ways, for example, it is appointed that 0 is the identity of the VoLTE data packet and 1 is the identity of the FEC redundant data packet; and the length of the current data packet is the length of that without the FEC group information.

For example, the first device receives three groups of first data packets, where the second group of first data packets includes 5 VoLTE data packets, and 2 FEC redundant data packets are obtained after performing the encoding on the 5 VoLTE data packets. The FEC group information is added to each of 5 VoLTE data packets and 2 FEC redundant data packets. The group number in the FEC group information is 2, the group size is 7, and this group includes 7 data packets which are 5 VoLTE data packets and 2 FEC redundant data packets respectively. For example, the order of the data packets in this group is: the first five are the VoLTE data packets and the last two are the FEC redundant data packets. For the fifth data packet, it is the VoLTE data packet, its data packet identity is 0, and its position within the group is 5; and for the sixth data packet, it is the FEC redundant data packet, its data packet identity is 1, and its position within the group is 6.

In the step S204 of the above-mentioned embodiments, the order in which the first device sends M VoLTE data packets and N FEC redundant data packets with the FEC group information added to the third device is: sending M VoLTE data packets firstly and then N FEC redundant data packets.

In the embodiments of the present application, the first device adds the group information corresponding to each of the M VoLTE data packets and the N FEC redundant data packets to the data packet, and sends the M VoLTE data packets and the N FEC redundant data packets with the FEC group information added to the third device. That is, the FEC group information is added to the data packets sent by the first device to the third device. Thus the integrity of the data packets sent by the first device to the third device is ensured, and the loss rate of the VoLTE data packets of the access network is lowered and the poor VoLTE call quality due to the poor transmission quality of the access network is improved.

In the above embodiments, the first, second and third devices are specifically as follows: the first device is a base station, the second device is a terminal, and the third device is a gateway; or the first device is a gateway, the second device is a core network, and the third device is a base station.

In the first case, the first device is a base station, the second device is a terminal, and the third device is a gateway. The VoLTE data guarantee method is specifically as follows: the base station receives at least one group of first data packets sent by the terminal, where the first data packets are uplink data packets; for each of the at least one group of first data packets: the base station performs the FEC encoding on M VoLTE data packets included in the group of first data packets to obtain N FEC redundant data packets; the base station adds the FEC group information corresponding to each of M VoLTE data packets and N FEC redundant data packets to the data packet; and the base station sends M VoLTE data packets and N FEC redundant data packets with the FEC group information added to the gateway. As such, the base station receives the uplink data packets sent by the terminal, performs the FEC encoding on the VoLTE data packets therein, and sends the VoLTE data packets and FEC redundant data packets with the FEC group information added to the gateway, ensuring the integrity of the data packets sent by the base station to the gateway. Even if the poor quality of the access network between the base station and the gateway leads to the loss of the VoLTE data packets when the base station sends the data packets to the gateway, the gateway can recover the lost VoLTE data packets according to the FEC group information and the FEC redundant data packets. Thus the loss rate of the VoLTE data packets is lowered and the poor VoLTE call quality due to the poor transmission quality of the access network is improved.

In the second case, the first device is a gateway, the second device is a core network, and the third device is a base station. The VoLTE data guarantee method is specifically as follows: the gateway receives at least one group of first data packets sent by the core network, where the first data packets are downlink data packets; for each of the at least one group of first data packets: the gateway performs the FEC encoding on M VoLTE data packets included in the group of first data packets to obtain N FEC redundant data packets; the gateway adds the FEC group information corresponding to each of M VoLTE: data packets and N FEC redundant data packets to the data packet; and the gateway sends M VoLTE data packets and N FEC redundant data packets with the FEC group information added to the base station. Thus, the gateway receives the downlink data packets sent by the core network, performs the FEC encoding on the VoLTE data packets therein, and sends the VoLTE data packets and FEC redundant data packets with the FEC group information added to the base station, ensuring the integrity of the data packets sent by the gateway to the base station. Even if the poor quality of the access network between the base station and the gateway leads to the loss of the VoLTE data packets when the gateway sends the data packets to the base station, the base station can recover the lost VoLTE data packets according to the FEC group information and the FEC redundant data packets. Thus the loss rate of the VoLTE data packets is lowered and the poor VoLTE call quality due to the poor transmission quality of the access network is improved.

Optionally, the VoLTE data guarantee method provided by the embodiments of the present application further includes: receiving, by the first device, at least one group of second data packets sent by the third device, where each of the at least one group of second data packets includes at least one VoLTE data packet and at least one FEC redundant data packet, and one group of second data packets corresponds to one service; for each of the at least one group of second data packets: for each data packet in the each group of second data packets, when the first device determines that the data packet includes the FEC group information, removing the FEC group information in the data packet; when the first device determines that the VoLTE data packet loss occurs in the group of second data packets, performing the FEC decoding on at least one VoLTE data packet according to at least one FEC redundant data packet in the group of second data packets to obtain the decoded VoLTE data packets if the number of the lost VoLTE data packets is not greater than the number of the received at least one FEC redundant data packet; sending, by the first device, the decoded VoLTE data packets to the second device.

In embodiments of the present application, when the first device is a base station, the second device is a terminal, and the third device is a gateway, the base station receives at least one group of data packets sent by the gateway. Where each group of data packets includes at least one VoLTE data packet and at least one FEC redundant data packet. For each group of data packets: if the VoLTE data packet loss occurs when the gateway sends the data packets to the base station and the number of the lost VoLTE data packets is not greater than the number of the received at least one FEC redundant data packet, the base station may recover the lost VoLTE data packets according to the FEC redundant data packet in the group of data packets. Thus the integrity of each group of VoLTE data packets is ensured, the loss rate of the VoLTE data packets is lowered, and the poor VoLTE call quality due to the poor transmission quality of the access network is improved.

Alternatively, when the first device is a gateway, the second device is a core network, and the third device is a base station, the gateway receives at least one group of data packets sent by the base station. Where each group of data packets includes at least one VoLTE data packet and at least one FEC redundant data packet; for each group of data packets, if the VoLTE data packet loss occurs when the base station sends the data packets to the gateway and the number of the lost VoLTE data packets is not greater than the number of the received at least one FEC redundant data packet, the gateway may recover the lost VoLTE data packets according to the FEC redundant data packet in the group of data packets, thus the integrity of each group of VoLTE data packets is ensured, the loss rate of the VoLTE data packets is lowered, and the poor VoLTE call quality due to the poor transmission quality of the access network is improved.

In embodiments of the present application, the first device sends M VoLTE data packets and N FEC redundant data packets with the FEC group information added to the third device as follows. The first device firstly sends M VoLTE data packets with the FEC group information added and then sends N FEC redundant data packets with the FEC group information added. Accordingly, the third device receives the data sent by the first device as follows. The third device firstly receives the VoLTE data packets and determines whether the VoLTE data packet loss occurs. If the VoLTE data packet loss occurs, for example, the number of the received VoLTE data packets is M−1, i.e., one VoLTE data packet is lost, the third device waits for N FEC redundant data packets with the same group number as M−1 VoLTE data packets to arrive, and performs the FEC decoding on the M−1 VoLTE data packets according to the N FEC redundant data packets to obtain the recovered lost VoLTE data packets, where N is greater than or equal to 1. The third device sends out the received M−1 VoLTE data packets and the recovered lost VoLTE data packets; if no VoLTE data packet loss occurs, the third device sends out M VoLTE data packets directly.

Optionally, after removing the FEC group information in the data packet, the method further includes that: for each data packet in the group of second data packets, the first device determines the group size and the position of the data packet in the group according to the FEC group information in the data packet; and the first device determines whether the VoLTE data packet loss occurs in the group of second data packets according to the group size and the position of the data packet in the group. Specifically, an implementation approach of determining that the data packet loss occurs is as follows. The first device determines that the data packet loss occurs in the group of second data packets when determining that the total number of at least one VoLTE data packet and at least one FEC redundant data packet is less than the group size, here the lost data packets may be the VoLTE data packets or FEC redundant data packets. Further, in case of packet loss, an implementation approach of determining whether a VoLTE data packet is lost is: to determine the discontinuous position in the VoLTE data packets as the position of the lost VoLTE data packet in the group according to the position of each data packet in the group of second data packets in the group. The specific implementation approach of determining whether the data packet or VoLTE data packet loss occurs is not limited to the above approaches.

Optionally, after the first device receives at least one group of second data packets sent by the third device, the method further includes the following step. For each of the at least one group of second data packets: for each data packet in the each group of second data packets, sending the data packet to the second device when the data packet meets a preset condition. Where the preset condition is either of: the data packet includes the FEC group information, and no VoLTE data packet loss occurs in the group of second data packets in which the data packet is located; the data packet does not include the FEC group information. That is, in a case that the data packet includes the FEC group information and no VoLTE data packet loss occurs in the group of second data packets in which the data packet is located, the first device sends this data packet to the second device; thus it may be quickly determined whether the VoLTE data packet loss occurs. If no VoLTE data packet loss occurs, no subsequent decoding operation is required. In a case that this data packet includes no FEC group information, the first device sends this data packet to the second device; thus it may be quickly judged whether this group is the VoLTE data packet, and no subsequent decoding operation is required for non-VoLTE data packet.

For the clearer introduction of the above method process, embodiments of the present application provides the following examples in which taking the first device is a base station, the second device is a terminal, and the third device is a gateway as an example.

Figure 3:
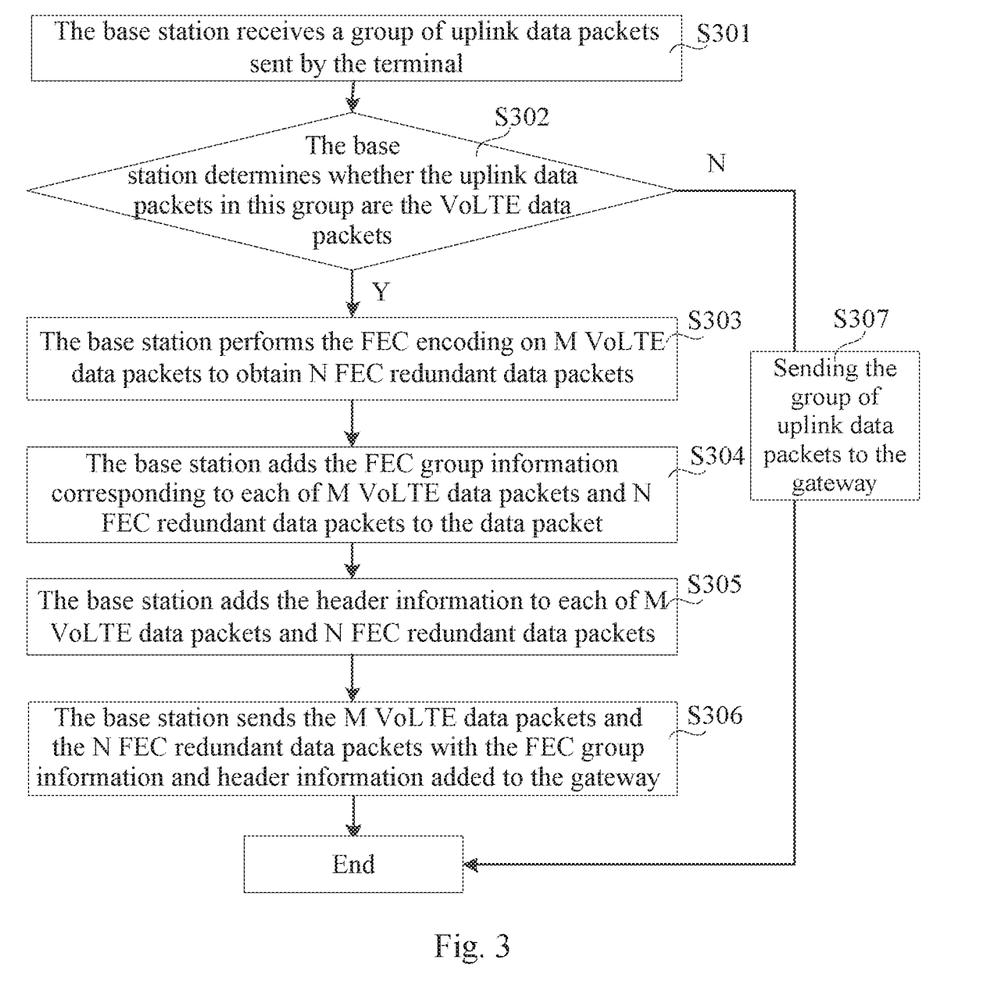
FIG. 3 is a flow schematic diagram of a method of guaranteeing the uplink VoLTE data received by a base station provided by embodiments of the present application.

FIG. 3 exemplarily shows a flow schematic diagram of a method of guaranteeing the uplink VoLTE data received by a base station provided by embodiments of the present application. Based on the system architecture shown in FIG. 1, as shown in FIG. 3, the uplink VoLTE data guarantee method provided by the embodiments of the present application includes the steps as follows.

Step S301: the base station receives a group of uplink data packets sent by the terminal, where the group of uplink data packets includes M data packets, and M is a positive integer;

Step S302: the base station determines whether the uplink data packets in this group are the VoLTE data packets; if so, performing step S303; if not, performing step S307;

Step S303: the base station performs the FEC encoding on M VoLTE data packets to obtain N FEC redundant data packets, where N is a positive integer less than M;

Step S304: the base station adds the FEC group information corresponding to each of M VoLTE data packets and N FEC redundant data packets to the data packet;

Step S305: the base station adds the header information to each of M VoLTE data packets and N FEC redundant data packets; where the header information is GTP/UDP/IP header in the GTP tunnelling mode; and the header information is UDP/IP header in the S1u tunnelling mode;

Step S306: the base station sends the M VoLTE data packets and the N FEC redundant data packets with the FEC group information and header information added to the gateway;

Step S307: the group of uplink data packets is sent to the gateway.

Figure 4:
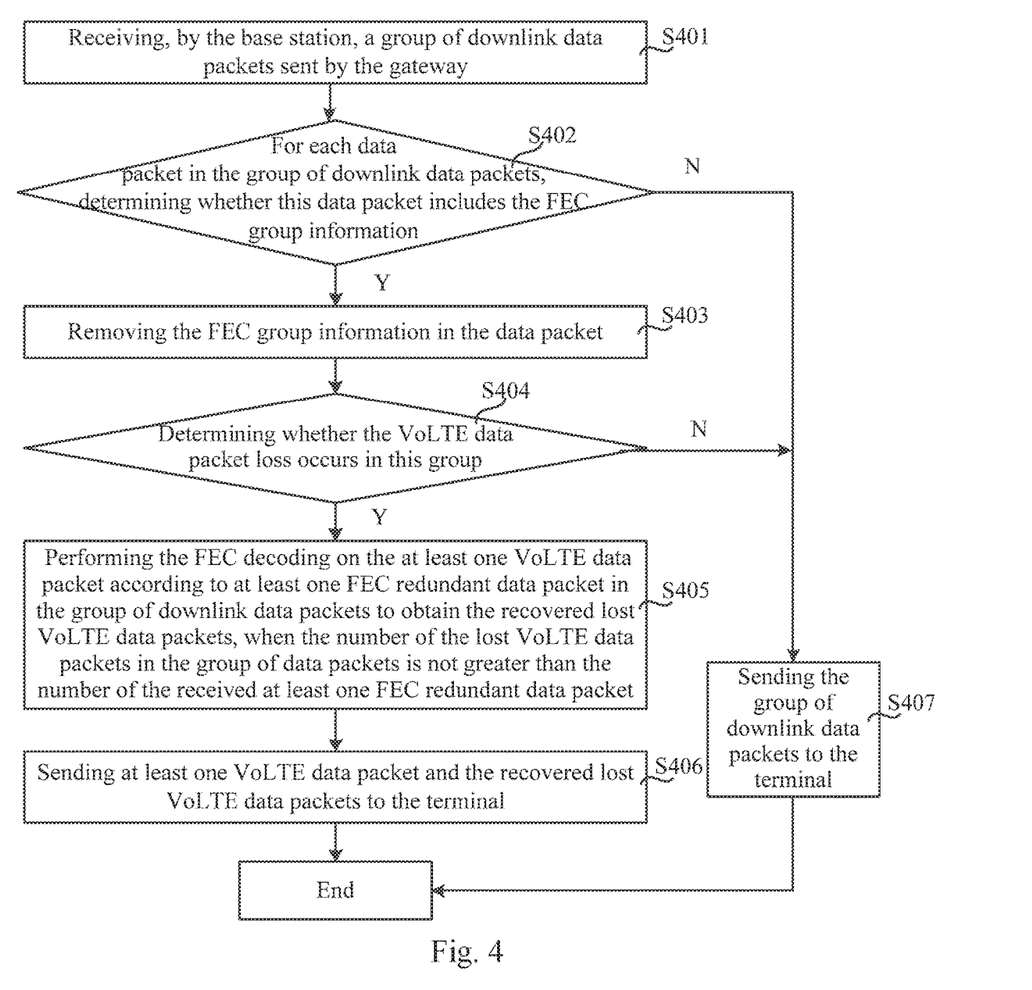
FIG. 4 is a flow schematic diagram of a method of guaranteeing the downlink VoLTE data received by a base station provided by embodiments of the present application.

FIG. 4 exemplarily shows a flow schematic diagram of a method of guaranteeing the downlink VoLTE data received by a base station provided by embodiments of the present application. Based on the system architecture shown in FIG. 1, as shown in FIG. 4, the downlink VoLTE data guarantee method provided by the embodiments of the present application includes the steps as follows.

Step S401: receiving, by the base station, a group of downlink data packets sent by the gateway, where the group of downlink data packets includes at least one downlink data packet, and a group of downlink data packets corresponds to one service;

Step S402: for each data packet in the group of downlink data packets, determining whether this data packet includes the FEC group information; if so, performing step S403; if not, performing step S407;

Step S403: removing the FEC group information in the data packet;

Step S404: determining whether the VoLTE data packet loss occurs in this group, if so, performing step S405; if not, performing step S407;

Step S405: performing the FEC decoding on the at least one VoLTE data packet according to at least one FEC redundant data packet in the group of downlink data packets to obtain the recovered lost VoLTE data packets when the number of the lost VoLTE data packets in the group of data packets is not greater than the number of the received at least one FEC redundant data packet;

Step S406: sending at least one VoLTE data packet and the recovered lost VoLTE data packets to the terminal;

Step S407: sending the group of downlink data packets to the terminal.

The above-mentioned embodiments may also be applied to the scenario in which the first device is a gateway, the second device is a core network, and the third device is a base station. Specifically, the gateway receives a group of downlink data packets sent by the core network, performs the FEC encoding on the group of VoLTE data packets to obtain the FEC redundant data packets when determining that the data packets in this group are the VoLTE data packets, adds FEC group information to each data packet and sends them to the base station. Upon receiving a group of uplink data packets sent by the base station and determining that the group of data packets includes the FEC group information, if the VoLTE data packet loss occurs in the group of data packets, the gateway performs the FEC decoding on the group of VoLTE data packets to obtain the recovered lost VoLTE data packets. Thus, in the embodiments of the present application, the FEC encoding and decoding operations are performed on the VoLTE data packets between the base station and the core network, to provide the guarantee for the transmission of the data packets between the base station and the gateway without damaging the real-time capability of the VoLTE call. In the scenario where the transmission quality of the access network of the LIE base station is poor and the internal traffic structure is complex, the introduction of the mechanism of recovering the lost packets in the network transmission to a certain extent may improve the customer call quality in this scenario and increase the benefits of the operators.

Optionally, for either of the VoLTE data packet including the FEC group information and the FEC redundant data packet including the FEC group information, the encapsulating format of the data packet is as follows. In the S1u tunnelling mode, the encapsulating sequence of the data packet is load, GTP header information, FEC group information, S1u tunnel User Datagram Protocol (UDP) header, S1u tunnel IP header, Ethernet header. In the GTP tunnelling mode, the encapsulating sequence of the data packet is load, FEC group information, GTP header information, S1u tunnel UDP header, S1u tunnel IP header, Ethernet header; where the load is either the VoLTE data or the FEC redundant data.

In order to introduce the encapsulating formats of the VoLTE data packet and the FEC redundant data packet more clearly, the present application provides the embodiments of the encapsulating formats of the data packet in the GTP tunnelling mode and S1u tunnelling mode for implementing the VoLTE data transmission guarantee method.

Figure 5:
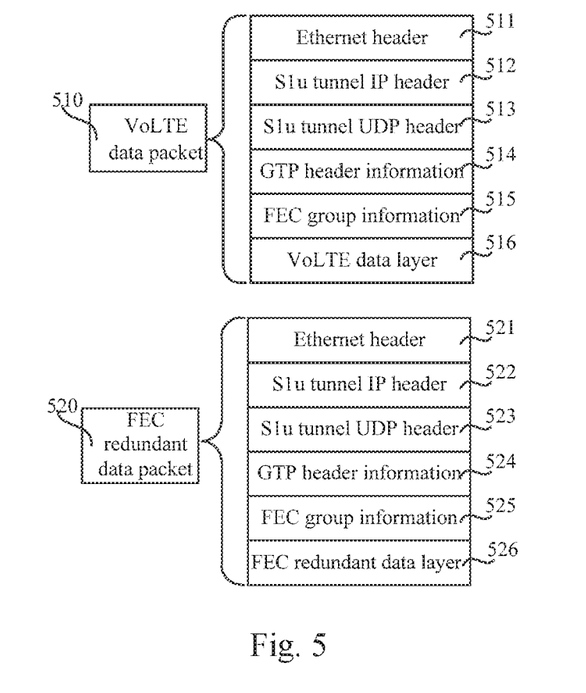
FIG. 5 is a schematic diagram of the encapsulating format of the data packet in the GPRS Tunneling Protocol (GTP) tunnelling mode provided by embodiments of the present application.

FIG. 5 exemplarily shows an example of the encapsulating format of the data packet in the GTP tunnelling mode provided by embodiments of the present application.

As shown in FIG. 5, the VoLTE data packet 510 includes: Ethernet header 511, S1u tunnel IP header 512, S1u tunnel UDP header 513, GTP header information 514, FEC group information 515 and VoLTE data layer 516, where the FEC group information is added between the GTP header information 514 and the VoLTE data layer 516. The FEC redundant data packet 520 includes: Ethernet header 521, S1u tunnel IP header 522, S1u tunnel UDP header 523, GTP header information 524, FEC group information 525 and FEC redundant data layer 526, where the FEC group information is added between the GTP header information 524 and the FEC redundant data layer 526.

In the embodiments of the present application, in the GTP tunnelling mode, the base station performs the FEC encoding on each group of VoLTE data packets in the uplink data packets to obtain the FEC redundant packets after receiving the uplink data packets sent by the terminal. For each VoLTE data packet 510, the group information 515 is added outside the VoLTE data layer 516, then the GTP header information 514, S1u tunnel UDP header 513, S1u tunnel IP header 512 and Ethernet header 511 are encapsulated. Then the encapsulated VoLTE data packet is sent to the gateway. For each FEC redundant data packet 520, the FEC group information 525 is added outside the FEC redundant data layer 526, then the GTP header information 524, S1u tunnel UDP header 523, S1u tunnel IP header 522 and Ethernet header 521 are encapsulated, and then the encapsulated FEC redundant data packet is sent to the gateway.

Figure 6:
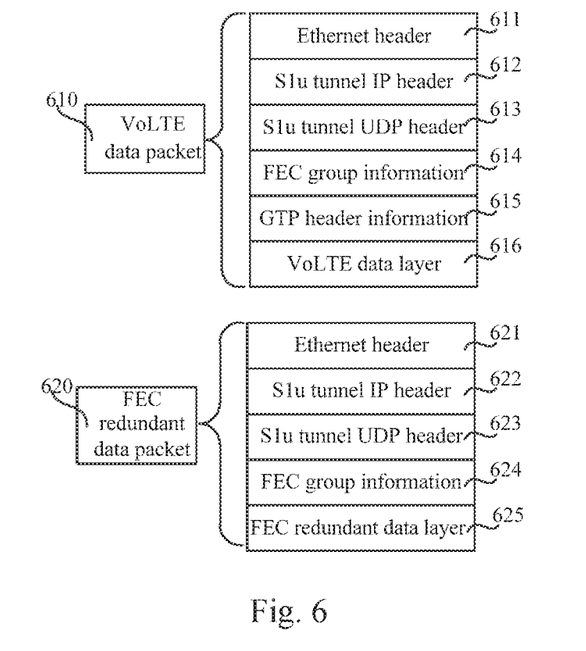
FIG. 6 is a schematic diagram of the encapsulating format of the data packet in the S1-U (S1u) tunnelling mode provided by embodiments of the present application.

FIG. 6 exemplarily shows an example of the encapsulating format of the data packet in the S1u tunnelling mode provided by embodiments of the present application. As shown in FIG. 6, the VoLTE data packet 610 includes: Ethernet header 611, S1u tunnel IP header 612, S1u tunnel UDP header 613, FEC group information 614, GTP header information 615 and VoLTE data layer 616, where the FEC group information is added between the S1u tunnel UDP header 613 and the GTP header information 615. The FEC redundant data packet 620 includes: Ethernet header 621, S1u tunnel IP header 622, S1u tunnel UDP header 623, FEC group information 624 and FEC redundant data layer 625, where the FEC group information is added between the S1u tunnel UDP header 623 and the FEC redundant data layer 625.

In the embodiments of the present application, in the S1u tunnelling mode, the base station performs the FEC encoding on each group of VoLTE data packets in the uplink data packets to obtain the FEC redundant packets after receiving the uplink data packets sent by the terminal. For each VoLTE data packet 610, the FEC group information 614 is added outside the VoLTE data layer 616 after the GTP header information 615 is added, then the S1u tunnel UDP header 613, S1u tunnel IP header 612 and Ethernet header 611 are encapsulated. Then the encapsulated VoLTE data packet is sent to the gateway. For each FEC redundant data packet 620, the FEC group information 624 is added outside the FEC redundant data layer 625, then the S1u tunnel UDP header 623, S1u tunnel IP header 622 and Ethernet header 621 are encapsulated, and then the encapsulated FEC redundant data packet is sent to the gateway.

According to the embodiments of the present application, the data packets in the prior art are updated and improved. The recovery of the lost data packets is implemented by adding the FEC group information to the data packets between the base station and the gateway, thereby lowering the packet loss rate and improving the poor VoLTE call quality due to the poor transmission quality of the access network.

Figure 7:
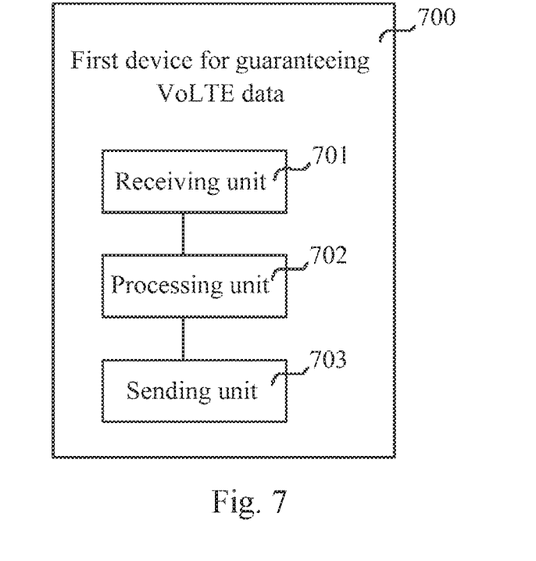
FIG. 7 is a structural schematic diagram of a first device for guaranteeing the VoLTE data provided by embodiments of the present application.

FIG. 7 exemplarily shows a structural schematic diagram of a first device for guaranteeing the VoLTE data provided by embodiments of the present application.

Based upon the same concept, a first device for guaranteeing the VoLTE data provided by the embodiments of the present application is used to perform the above-mentioned method flow, and as shown in FIG. 7, the first device 700 includes a receiving unit 701, a processing unit 702 and a sending unit 703, where:

the receiving unit 701 is configured to receive at least one group of first data packets sent by a second device, where each of the at least one group of first data packets includes at least one first data packet, and one group of first data packets corresponds to one service;

the processing unit 702 is configured, for each of the at least one group of first data packets, to perform the FEC encoding on M VoLTE data packets included in the group of first data packets to obtain N FEC redundant data packets, where M is a positive integer and N is a positive integer less than M; and to add the FEC group information corresponding to each of the M VoLTE data packets and the N FEC redundant data packets to the data packet; the sending unit 703 is configured to send the M VoLTE data packets and the N FEC redundant data packets with the FEC group information added to a third device.

Optionally, the first device is a base station, the second device is a terminal, and the third device is a gateway; or the first device is a gateway, the second device is a core network, and the third device is a base station.

Optionally, the receiving unit 701 is further configured to: receive at least one group of second data packets sent by the third device, where each of the at least one group of second data packets includes at least one VoLTE data packet and at least one FEC redundant data packet, and one group of second data packets corresponds to one service; the processing unit 702 is further configured to: for each of the at least one group of second data packets: for each data packet in the group of second data packets, when the first device determines that the data packet includes the group information, remove the FEC group information in the data packet; when determining that the VoLTE data packet loss occurs in the group of second data packets, perform the FEC decoding on the at least one VoLTE data packet according to at least one FEC redundant data packet in the group of second data packets to obtain the recovered lost VoLTE data packets; the sending unit 703 is further configured to: send the decoded VoLTE data packets to the second device.

Optionally, the processing unit 702 is further configured to: for each data packet in the group of second data packets, determine, at the first device side, the group size and the position of the data packet in the group according to the FEC group information in the data packet; and determine, at the first device side, whether the VoLTE data packet loss occurs in the group of second data packets according to the group size and the position of the data packet in the group.

Optionally, the sending unit 703 is further configured to: for each of the at least one group of second data packets: for each data packet in the group of second data packets, send the data packet to the second device when the data packet meets a preset condition. Where the preset condition is either of: the data packet includes the FEC group information, and no VoLTE data packet loss occurs in the group of second data packets in which the data packet is located; the data packet does not include the FEC group information.

Optionally, for either of the VoLTE data packet including the FEC group information and the FEC redundant data packet including the FEC group information, the encapsulating format of the data packet is as follows, in the S1u tunnelling mode, the encapsulating sequence of the data packet from inside to outside is data layer, GTP header information, FEC group information. S1u tunnel UDP header, S1u tunnel IP header, Ethernet header. In the GTP tunnelling mode, the encapsulating sequence of the data packet from inside to outside is data layer, FEC group information, GTP header information, S1u tunnel UDP header, S1u tunnel IP header, Ethernet header; where the data layer is either the VoLTE data layer or the FEC redundant data layer.

As can be seen from the above, the first device adds the group information corresponding to each of the M VoLTE data packets and the N FEC redundant data packets to the data packet, and sends the M VoLTE data packets and the N FEC redundant data packets with the FEC group information added to the third device. That is, the FEC group information is added to the data packets sent by the first device to the third device. Thus the integrity of the data packets sent by the first device to the third device is ensured, the loss rate of the VoLTE data packets of the access network is lowered and the poor VoLTE call quality due to the poor transmission quality of the access network is improved.

It should be understood that the division of the above units is only the division of the logical functions, and these units may be fully or partially integrated into a physical entity or may be separated physically in the actual implementations.

Figure 8:
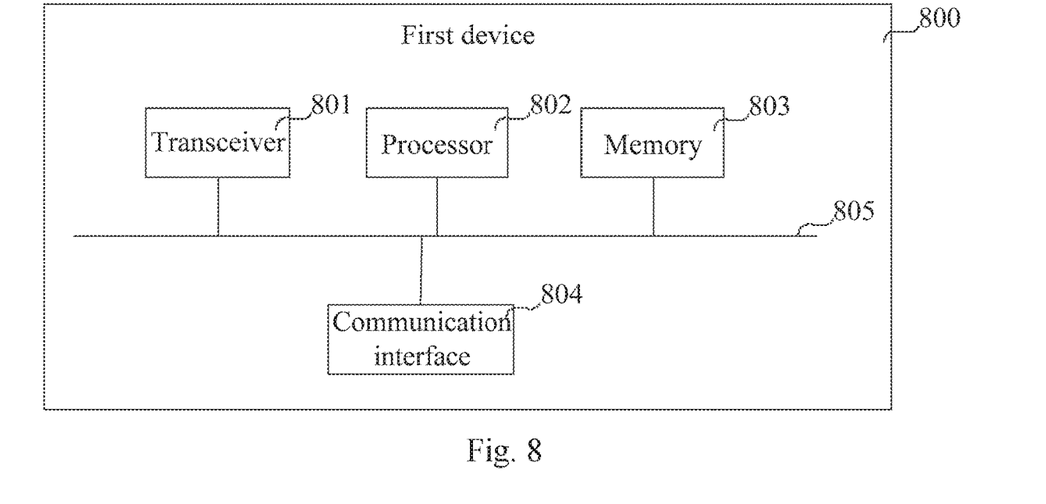
FIG. 8 is a structural schematic diagram of a first device provided by embodiments of the present application.

Based upon the same concept, the present application provides a first device which can be used to perform the flow of the VoLTE data guarantee method described above. FIG. 8 is a structural schematic diagram of a first device provided by the present application. The first device 800 includes a transceiver 801, a processor 802, a memory 803 and a communication interface 804, where the transceiver 801, the processor 802, the memory 803 and the communication interface 804 are interconnected via the bus 805.

Here, the memory 803 is configured to store the programs. Specifically, the programs may include the program codes including the computer operation instructions. The memory 803 may be a volatile memory, e.g., Random-Access Memory (RAM); or may be a non-volatile memory, e.g., flash memory, Hard Disk Drive (HDD) or Solid-State Drive (SSD); or may be a combination of any one or more of the volatile memories and non-volatile memories described above.

The memory 803 stores the elements of: executable modules or data structures, or their subsets, or their extension sets:

operation instructions including various operation instructions for implementing various operations;

operation systems including various system programs for implementing various basic services and processing hardware-based tasks.

The bus 805 may be the Peripheral Component Interconnect (PCI) bus or Extended Industry Standard Architecture (EISA) bus or the like. The bus may be divided into the address bus, data bus, control bus and so on. For ease of representation, the bus is represented by only one thick line in FIG. 8, but it does not represent only one bus or only one type of bus.

The communication interface 804 may be a wired communication interface, a wireless communication interface or the combination thereof, where the wired communication interface may be an Ethernet interface for example. The Ethernet interface may be an optical interface, an electrical interface or the combination thereof. The wireless communication interface may be a WLAN interface.

The processor 802 may be the Central Processing Unit (CPU), Network Processor (NP) or the combination of the CPU and NP. It may also be a hardware chip. The above-mentioned hardware chip may be an Application-Specific Integrated Circuit (ASIC), a Programmable Logic Device (PLD) or the combination thereof. The above-mentioned PLD may be a Complex Programmable Logic Device (CPLD), Field-Programmable Gate Array (FPGA), Generic Array Logic (GAL) or any combination thereof.

The transceiver 801 is configured to receive at least one group of first data packets sent by a second device and send M VoLTE data packets and N FEC redundant data packets with FEC group information added to a third device. Where each of the at least one group of first data packets includes at least one first data packet, and one group of first data packets corresponds to one service.

The processor 802 is configured to read the programs in the memory 803 to perform the method of:

for each of the at least one group of first data packets, performing the FEC encoding on M VoLTE data packets included in the group of first data packets to obtain N FEC redundant data packets, where M is a positive integer and N is a positive integer less than M;

adding the FEC group information corresponding to each of the M VoLTE data packets and the N FEC redundant data packets to the data packet.

The memory 803 is configured to store one or more executable programs and may store the data used by the processor 802 when performing the operations.

In the embodiments of the present application, the first device receives at least one group of first data packets sent by the second device, where each of the at least one group of first data packets includes at least one first data packet, and one group of first data packets corresponds to one service. For each of the at least one group of first data packets: the first device performs the FEC encoding on M VoLTE data packets included in the group of first data packets to obtain N FEC redundant data packets. The first device adds the FEC group information corresponding to each of the M VoLTE data packets and the N FEC redundant data packets to the data packet, and sends the M VoLTE data packets and the N FEC redundant data packets with the FEC group information added to the third device. That is to say, the FEC group information is added to the data packets sent by the first device to the third device. Thus the integrity of the data packets sent by the first device to the third device is ensured, the loss rate of the VoLTE data packets of the access network is lowered and the poor VoLTE call quality due to the poor transmission quality of the access network is improved.

Optionally, the first device is a base station, the second device is a terminal, and the third device is a gateway; or the first device is a gateway, the second device is a core network, and the third device is a base station.

Optionally, the transceiver 801 is further configured to: receive at least one group of second data packets sent by the third device, where each of the at least one group of second data packets includes at least one VoLTE data packet and at least one FEC redundant data packet, and one group of second data packets corresponds to one service; send the at least one VoLTE data packet and the recovered lost VoLTE data packets to the second device; the processor 802 is further configured to: for each of the at least one group of second data packets: for each data packet in the group of second data packets, when the first device determines that the data packet includes the FEC group information, remove the FEC group information in the data packet; when determining that the VoLTE data packet loss occurs in the group of second data packets, perform the FEC decoding on the at least one VoLTE data packet according to at least one FEC redundant data packet in the group of second data packets to obtain the recovered lost VoLTE data packets if the number of the lost VoLTE data packets is not greater than the number of the received at least one FEC redundant data packet.

Optionally, the processor 802 is further configured to: for each data packet in the group of second data packets, determine, at the first device side, the group size and the position of the data packet in the group according to the FEC group information in the data packet; and determine, at the first device side, whether the VoLTE data packet loss occurs in the group of second data packets according to the group size and the position of the data packet in the group.

Optionally, the transceiver 801 is further configured to: for each of the at least one group of second data packets: for each data packet in the each group of second data packets, send the data packet to the second device when the data packet meets a preset condition, where the preset condition is either of: the data packet includes the FEC group information, and no VoLTE data packet loss occurs in the group of second data packets in which the data packet is located; the data packet does not include the FEC group information.

Optionally, for either of the VoLTE data packet including the FEC group information and the FEC redundant data packet including the FEC group information, the encapsulating format of the data packet is as follows: in the S1u tunnelling mode, the encapsulating sequence of the data packet from inside to outside is data layer, GTP header information, FEC group information, S1u tunnel UDP header, S1u tunnel IP header, Ethernet header; in the GTP tunnelling mode, the encapsulating sequence of the data packet from inside to outside is data layer, FEC group information, GTP header information, S1u tunnel UDP header, S1u tunnel IP header, Ethernet header; where the data layer is either the VoLTE data layer or the FEC redundant data layer.

It should be understood by those skilled in the art that the embodiments of the present application can provide methods, systems and computer program products. Thus the embodiments of the present application can take the form of hardware embodiments alone, software embodiments alone, or embodiments combining the software and hardware aspects. Also the embodiments of the present application can take the form of computer program products implemented on one or more computer usable storage mediums (including but not limited to magnetic disk memories, CD-ROMs, optical memories and the like) containing computer usable program codes therein.

The embodiments of the present application are described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the embodiments of the present application without departing from the spirit and scope of the present application. Thus the present application is also intended to encompass these modifications and variations therein as long as these modifications and variations to the embodiments of the present application come into the scope of the claims of the present application and their equivalents.

What is claimed is:

1. A Voice over Long-Term Evolution, VoLTE, data guarantee method, comprising:
   receiving, by a first device, at least one group of first data packets sent by a second device, wherein each of the at least one group of first data packets comprises at least one first data packet, and one group of first data packets corresponds to one service;
   for each of the at least one group of first data packets:
   performing, by the first device, Forward Error Correction, FEC, encoding on M VoLTE data packets comprised in the group of first data packets to obtain N FEC redundant data packets, wherein M is a positive integer and N is a positive integer less than M;
   adding, by the first device, FEC group information corresponding to each of the M VoLTE data packets and the N FEC redundant data packets to the data packet;
   sending, by the first device, M VoLTE data packets and N FEC redundant data packets with the FEC group information added to a third device.

2. The method of claim 1, wherein the first device is a base station, the second device is a terminal, and the third device is a gateway;
   or the first device is a gateway, the second device is a core network, and the third device is a base station.

3. The method of claim 1, wherein the method further comprises:
   receiving, by the first device, at least one group of second data packets sent by the third device, wherein each of the at least one group of second data packets comprises at least one VoLTE data packet and at least one FEC redundant data packet, and one group of second data packets corresponds to one service;
   for each of the at least one group of second data packets:
   for each data packet in the each group of second data packets, when the first device determines that the data packet comprises FEC group information, removing the FEC group information in the data packet;
   when the first device determines that VoLTE data packet loss occurs in the group of second data packets, performing FEC decoding on the at least one VoLTE data packet according to at least one FEC redundant data packet in the group of second data packets, to obtain recovered lost VoLTE data packets if a quantity of the lost VoLTE data packets is not greater than a quantity of the received at least one FEC redundant data packet;
   sending, by the first device, the at least one VoLTE data packet and the recovered lost VoLTE data packets to the second device.

4. The method of claim 3, wherein after removing the FEC group information in the data packet, the method further comprises:
   for each data packet in the each group of second data packets:
   determining, by the first device, group size and a position of the data packet in the group according to the FEC group information in the data packet;
   determining, by the first device, whether VoLTE data packet loss occurs in the group of second data packets according to the group size and the position of the data packet in the group.

5. The method of claim 3, wherein after the first device receives at least one group of second data packets sent by the third device, the method further comprises:
   for each of the at least one group of second data packets:
   for each data packet in the each group of second data packets, sending the data packet to the second device when the data packet meets a preset condition, wherein the preset condition is either of:
   the data packet comprises FEC group information, and no VoLTE data packet loss occurs in the group of second data packets in which the data packet is located;
   the data packet does not comprise FEC group information.

6. The method of claim 1, wherein for either of the VoLTE data packet comprising FEC group information and the FEC redundant data packet comprising FEC group information, encapsulating format of the data packet is as follows:
   in a S1u tunnelling mode, an encapsulating sequence of the data packet from inside to outside is data layer, General Packet Radio Service, GPRS Tunneling Protocol, GTP, header information, FEC group information, S1u tunnel User Datagram Protocol, UDP, header, S1u tunnel Internet Protocol, IP, header, Ethernet header;

in a GTP tunnelling mode, an encapsulating sequence of the data packet from inside to outside is data layer, FEC group information, GTP header information, S1u tunnel UDP header, S1u tunnel IP header, Ethernet header;

wherein the data layer is either VoLTE data layer or FEC redundant data layer.

7. A first device, comprising: a transceiver, a processor, a memory and a communication interface, wherein the transceiver, the processor, the memory and the communication interface are connected via a bus;

the transceiver is configured to receive at least one group of first data packets sent by a second device and send M VoLTE data packets and N FEC redundant data packets with FEC group information added to a third device, wherein each of the at least one group of first data packets comprises at least one first data packet, and one group of first data packets corresponds to one service;

the processor is configured to read programs in the memory to perform a method of:

for each of the at least one group of first data packets, performing Forward Error Correction, FEC, encoding on M VoLTE data packets comprised in the group of first data packets to obtain N FEC redundant data packets, wherein M is a positive integer and N is a positive integer less than M;

adding FEC group information corresponding to each of the M VoLTE data packets and the N FEC redundant data packets to the data packet;

the memory is configured to store one or more executable programs and store data used by the processor when performing operations.

8. The first device of claim 7, wherein the first device is a base station, the second device is a terminal, and the third device is a gateway;

or the first device is a gateway, the second device is a core network, and the third device is a base station.

9. The first device of claim 7, wherein the transceiver is further configured to:

receive at least one group of second data packets sent by the third device, wherein each of the at least one group of second data packets comprises at least one VoLTE data packet and at least one FEC redundant data packet, and one group of second data packets corresponds to one service;

send the at least one VoLTE data packet and recovered lost VoLTE data packets to the second device;

the processor is further configured to:

for each of the at least one group of second data packets:

for each data packet in the each group of second data packets, when the first device determines that the data packet comprises FEC group information, remove the FEC group information in the data packet;

when determining that VoLTE data packet loss occurs in the group of second data packets, perform FEC decoding on the at least one VoLTE data packet according to at least one FEC redundant data packet in the group of second data packets to obtain recovered lost VoLTE data packets, if a quantity of the lost VoLTE data packets is not greater than a quantity of the received at least one FEC redundant data packet.

10. The first device of claim 9, wherein the processor is further configured to:

for each data packet in the group of second data packets:

determine group size and a position of the data packet in the group according to the FEC group information in the data packet;

determine whether VoLTE data packet loss occurs in the group of second data packets according to the group size and the position of the data packet in the group.

11. The first device of claim 9, wherein the transceiver is further configured to:

for each of the at least one group of second data packets:

for each data packet in the each group of second data packets, send the data packet to the second device when the data packet meets a preset condition, wherein the preset condition is either of:

the data packet comprises FEC group information, and no VoLTE data packet loss occurs in the group of second data packets in which the data packet is located;

the data packet does not comprise FEC group information.

12. The first device of claim 7, wherein for either of the VoLTE data packet comprising FEC group information and the FEC redundant data packet comprising FEC group information, an encapsulating format of the data packet is as follows:

in a S1u tunnelling mode, an encapsulating sequence of the data packet from inside to outside is data layer, General Packet Radio Service, GPRS Tunneling Protocol, GTP, header information, FEC group information, S1u tunnel User Datagram Protocol, UDP, header, S1u tunnel Internet Protocol, IP, header, Ethernet header;

in a GTP tunnelling mode, an encapsulating sequence of the data packet from inside to outside is data layer, FEC group information, GTP header information, S1u tunnel UDP header, S1u tunnel IP header, Ethernet header;

wherein the data layer is either VoLTE data layer or FEC redundant data layer.

13. A non-transitory computer readable storage medium, wherein the non-transitory computer readable storage medium stores computer instructions which cause a computer to perform the method of claim 1.

14. A computer program product, wherein the computer program product comprises computer programs stored on a non-transitory computer readable storage medium, wherein the computer programs comprise computer instructions which, when executed by a computer, cause the computer to perform the method of claim 1.

* * * * *